June 3, 1952  G. W. LAI  2,598,704
MOUNTING CLAMP
Filed Nov. 8, 1949
Fig 1
Fig 2
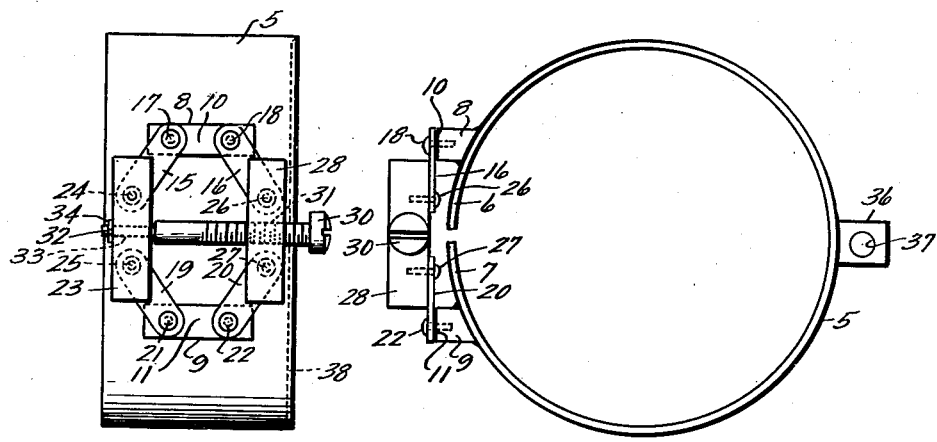
Fig 3
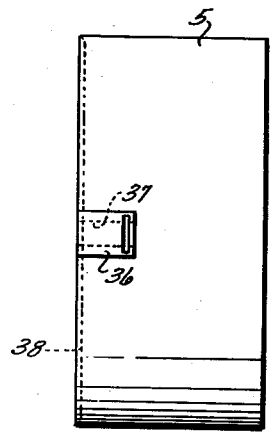
INVENTOR.
GUY WILLIAM LAI
BY Wade Koonty
ATTORNEY
H. H. Loscke and
AGENT Patented June 3, 1952

2,598,704

UNITED STATES PATENT OFFICE 2,598,704

MOUNTING CLAMP

Guy W. Lai, Osborn, Ohio

Application November 8, 1949, Serial No. 126,181

1 Claim. (Cl. 248—27)

(Granted under the act of March 3, 1883, as amended April 30, 1928; 370 O. G. 757)

The invention described herein may be manufactured and used by or for the United States Government for governmental purposes without payment to me of any royalty thereon.

This invention relates to clamps and more particularly to instrument clamps that are mountable on instrument panels and have means for quickly clamping or releasing instruments or other devices therein by the operation of a single screw.

According to the present invention, a split cylindrical member has a lug thereon for supporting it on an instrument panel. Across the split portion of the cylindrical member is a pair of toggle elements that are adjustable relative to each other to cause the end portions of the cylindrical member to advance or retreat producing a change in diameter of the cylindrical member. While the cylindrical member can be forced to expand or contract radially by adjusting the relative position of the toggle element, as by a screw, the cylindrical member is preferably formed having a radial expansive force which will eliminate any lost motion in the toggle elements upon clamping or releasing a device. Although the invention shows and describes a cylindrical clamp that is quickly actuatable to release instruments, or the like, the clamping member may be a band and take other forms for clamping irregularly shaped objects, as desired. It is therefore an object of this invention to provide a clamping device that is readily and quickly actuatable by a single screw adjustable to change the relative position of the toggle elements bridging the end of the clamping member to vary the area within the clamping member.

These and other objects and advantages will become more apparent as the description proceeds when taken in conjunction with the accompanying drawing in which:

Fig. 1 is an elevational view of the clamp showing the toggle power transmitting arrangement;

Fig. 2 is an end elevational view of the clamp; and

Fig. 3 is an elevational view of the clamp diametrically across from the toggle mechanism.

In order to accomplish rapid clamping action a pair of toggle devices are used as shown in which a cylindrical member 5 is split parallel to its axis of curvature to form cylindrical wall end portions 6 and 7. On each cylindrical wall end portion is a block 8 and 9, respectively, that is fixed to the cylindrical member as by welding, riveting, or the like. The outer faces 10 and 11, respectively, of these blocks are flat and lie in the same plane.

On the face 10 of the block 8 are two links 15 and 16 each having an end thereof pivoted in longitudinal alignment to the block 8 by rivets, cap screws, or the like, 17 and 18, respectively. In like manner, two such links 19 and 20 are pivoted to the block 9 on the face 11 by rivet or cap screw means 21 and 22. The free ends of the links 15 and 19 are pivoted respectively to a block 23 at 24 and 25, and the free ends of links 16 and 20 are pivoted respectively by rivets, cap screws, or the like, 26 and 27 to a block 28. The pivotal points at 24 and 25, 17 and 21, 18 and 22, and 26 and 27 all lie in radial planes of the cylindrical member 5 to permit the two blocks 23 and 28 to be varied in their related distance along a line parallel to the center line or axis of the member 5 without any angular change or binding.

In order to drive the two blocks 23 and 28 to and from each other a screw 30 is threaded through a screw threaded opening 31 in the block 28 and has a shank portion 32 of reduced diameter extending through a drilled opening 33 in the block 23. The shank portion 32 of the screw 30 has a circumferential groove outwardly from the screw threaded portion a greater distance slightly than the thickness of the block 23 in which groove is a spring ring 34. By this arrangement, screw 30 is freely rotatable but restricted against longitudinal movement in either direction in the block 23.

On a portion of the cylindrical member 5, preferably diametrically opposite the split thereof, is a mounting lug 36 that is welded, riveted, or otherwise secured to the outer surface of the member 5 near the front thereof as shown in Figs. 2 and 3 for mounting the clamp on an instrument panel, or the like. The lug 36 has an opening 37 therethrough for a mounting screw or bolt. The material of the cylindrical member 5 may be bent to form the lug 36, and, likewise, the cylindrical member 5 may have the end portions 6 and 7 turned outwardly or formed to make a reverse turn to replace the blocks 8 and 9 where desirable or expedient.

In order to permit instruments or other devices to be easily inserted in the clamp the front peripheral portion of the cylindrical member 5 is chamfered inwardly at 38 which will direct the device installed to a central aligned position. Once an instrument or other device to be clamped is positioned in the member 5 it is only necessary to rotate the clamping screw 30 clockwise, assuming that a standard right hand thread is used on the screw 30 and in the block 28, to tighten the cylindrical member 5 around the device. Clockwise rotation of the clamping screw 30 threads the block 28 toward the screw head which results in increasing the distance between the two blocks 23 and 28. As the blocks 23 and 28 are spread apart the blocks 8 and 9 on the cylindrical member end portions 6 and 7 are moved toward each other through the links 15, 16, 19, and 20. Since there is considerable mechanical advantage in the toggle arrangement and the clamping screw, the device clamped can be held securely, and the clamp is self locking to prevent inadvertent release.

It may readily be seen that the greater the pitch of the threads the quicker the clamp will be actuated to clamp or release a device per turn of the clamping screw 30. It may also be readily realized that a cam may be used to adjust the relative distance of the block 23 and 28 since screw threads are essentially cams or inclines on which a follower is raised or lowered. The operative speed of the clamp can be changed at the will of the maker merely by changing the thread pitch. A clamping screw 30 having a left hand threaded portion and a right hand threaded portion of different diameters may be used in the blocks 23 and 28 to cause the block 23 to travel on the clamping screw and thus increase the closing or parting speed of the blocks 23 and 28. The screw or cam means need only operate to force the blocks 23 and 28 apart since the cylindrical member 5 may be, and preferably is, formed to have an opening bias.

While only a preferred embodiment is shown and described it is to be understood that many modifications and changes may be made in the device without departing from the spirit and the scope of my invention and I desire to be limited only by the scope of the appended claim.

What I claim to be my invention and desire to secure by Letters Patent is:

A quick release instrument clamp comprising a band having its ends brought into close relation and having mounting lug means thereon, two blocks, one block having a screw threaded opening therethrough and the other block having a drilled opening therethrough, said blocks being positioned with said openings in axial alignment and parallel to the band ends, each block having one end of each of two links pivoted thereto and the other end of one link of each block pivoted to a supporting block fixed at one end of said band and the other end of the other link of each block pivoted to another supporting block fixed at the other end of said band; and a threaded screw having a shank portion, said screw being threaded through the threaded opening of said one block with said shank portion rotatably and axially immovably journaled in the drilled opening of said other block whereby rotation of said screw varies the distance between said blocks causing the distance between said band ends to vary to vary the area within the band in order to releaseably clamp the device in said band.

GUY W. LAI.

REFERENCES CITED

The following references are of record in the file of this patent:

UNITED STATES PATENTS

| Number | Name | Date |
|---|---|---|
| 95,322 | Carter | Sept. 28, 1869 |
| 96,843 | Smith | Nov. 16, 1869 |
| 161,751 | Butterworth | Apr. 6, 1875 |
| 442,135 | Peterson | Dec. 9, 1890 |
| 1,175,833 | Springer | Mar. 14, 1916 |
| 1,241,308 | Van Den Heuvel | Sept. 25, 1917 |
| 1,497,922 | Lux | June 17, 1924 |
| 1,629,246 | Arrington | May 17, 1927 |
| 1,910,116 | Malleville | May 23, 1933 |
| 2,100,604 | Kollsman | Nov. 30, 1937 |
| 2,194,317 | O'Neill | Mar. 19, 1940 |
| 2,555,378 | Shuter | June 5, 1951 |

FOREIGN PATENTS

| Number | Country | Date |
|---|---|---|
| 61,112 | Germany | Feb. 16, 1892 |